(12) United States Patent
Huey et al.

(10) Patent No.: US 6,963,909 B1
(45) Date of Patent: Nov. 8, 2005

(54) CONTROLLING THE RESPONSE DOMAIN OF A BOOTP/DHCP SERVER BY USING NETWORK PHYSICAL TOPOLOGY INFORMATION

(75) Inventors: Andy T. Huey, San Leandro, CA (US); James E. Kracht, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 723 days.

(21) Appl. No.: 09/912,852

(22) Filed: Jul. 24, 2001

(51) Int. Cl.[7] ..................... G06F 15/177; G06F 15/173
(52) U.S. Cl. ..................... 709/222; 209/220; 209/223; 209/225; 209/226; 370/254; 710/8; 710/9; 710/10
(58) Field of Search ................. 709/200–226; 713/1, 2; 710/3, 8–10, 36, 100, 104, 300, 710/301; 370/254, 257

(56) References Cited

U.S. PATENT DOCUMENTS

| | | | | |
|---|---|---|---|---|
| 5,909,591 | A * | 6/1999 | Brooke | 710/9 |
| 6,415,314 | B1 * | 7/2002 | Fee et al. | 709/201 |
| 6,662,254 | B1 * | 12/2003 | Tal et al. | 710/300 |
| 6,687,245 | B2 * | 2/2004 | Fangman et al. | 370/356 |
| 6,757,748 | B1 * | 6/2004 | Hipp | 710/2 |
| 2004/0015957 | A1 * | 1/2004 | Zara et al. | 717/174 |

OTHER PUBLICATIONS

LinkBuilder MSH User Guide, Jun. 1996.*
RFC 2131, Dynamic Host Configuration Protocol, Mar. 1997.*
Microsoft Computer Dictionary, 5th Edition. p.155.*
"Method and System for Executing, Tracking and Restoring Temporary Router Configuration Change Using A Centralized Database", 37 pp. Specification, 6 pp. Claims, 7 Shts. Drawings, 1 pg. Abstract, Kathail, et al., Oct. 12, 1999, U.S. Appl. No. 09/416,310, CISCO-1311.
"Method and System Externally Managing Router Configuration Data in Conjunction with a Centralized Database", 35 pp. Specification, 15 pp. Claims, 8 Shts. Drawings, 1 pg. Abstract, Pradeep Kathail, Jan. 6, 2000, U.S. Appl. No. 09/479,607, CISCO-1313.
"Method and System for Verifying Configuration Transactions managed by a Centralized Database", 32 pp. Specification, 6 pp. Claims, 7 Shts. Drawings, 1 Abstract, Kathail, et al., Oct. 12, 1999, U.S. Appl. No. 09/416,312, CISCO-1320.
"Subsystem Application Notification Method in a Centralized Router Database", 35 pp. Specification, 6 pp. Claims, 9 Shts. Drawings, 1 Abstract, Bion, et al., Oct. 12, 1999, U.S. Appl. No. 09/416,308, CISCO-1321.
"Identifying Modular Chassis Composition by using Network Physical Topology Information", 19 pp. Specification, 19 pp. Claims, 23 Shts. Drawings, 1 Abstract, James Kracht, Aug. 1, 2001, U.S. Appl. No. 09/922,175, CISCO-3550.
"Method and Apparatus for IP Address Assignment", 8 pp. Specification, 8 pp. Claims, 5 Shts. Drawings, 1 Abstract, Huo et al., Sep. 5, 2001, U.S. Appl. No. 09/947,595, CISCO-4407.
"Use of Non-Volatile Memory Devices as Read/Write Devices during Bootstrapping and Similar Uses", 15 pp. Specification, 7 pp. Claims, 4 Shts. Drawing, 1 Abstract, Jainendra Kumar, Dec. 27, 2000, U.S. Appl. No. 09/751,3448, CISCO-3507.

* cited by examiner

*Primary Examiner*—Jeffrey Caffin
*Assistant Examiner*—David E Martinez
(74) *Attorney, Agent, or Firm*—Sierra Patent Group, Ltd.

(57) ABSTRACT

A method and apparatus for assigning IP addresses to occupants in a communications system chassis with an Ethernet backplane and at least one internal chassis occupant, comprising receiving a request for an IP address from a component, determining whether the component is an internal chassis occupant, if the component is an internal chassis occupant, assigning an IP address to the component.

3 Claims, 7 Drawing Sheets

CONTROLLING THE RESPONSE DOMAIN OF A BOOTP/DHCP SERVER BY USING NETWORK PHYSICAL TOPOLOGY INFORMATION

BACKGROUND OF INVENTION

1. Field of Invention

The present invention relates to the assigning of IP addresses to internal components of a modular network system.

2. The Background Art

The widespread use and acceptance of the Internet has generated much excitement, particularly among those who see advantages in networking their voice and data communications in an Integrated Communications System ("ICS"). The ICS is often comprised of a manufacturer's proprietary system. Thus in order to set up and maintain the ICS, a computer network specialist trained and certified in the manufacturer's proprietary system is needed. Due to the nature and importance of keeping the computer network online and working properly, the computer network specialist is often a permanent employee of the business entity installing and maintaining the ICS.

An ICS system 100 known in the art is shown in FIG. 1 and includes an ICS chassis 110 including at least one internet router 116 known in the art. The user 120, usually a trained and certified computer network specialist, sets up and configures the ICS 110 which typically may involve the selecting the proper network and router cards for the ICS chassis 110, the assigning of IP addresses for the various components within the ICS chassis, and the verifying of proper communication between the ICS chassis and various hardware components such as IP telephones, personal computers, and IP video.

Once the ICS chassis is properly configured, a vendor 140 may communicate with both the user 120 and the ICS 110 using a network such as the Internet 130. Once so connected, the vendor 140 may remotely assist the user 120 in the configuration and trouble shooting of the ICS 110.

However, small to medium size businesses typically cannot afford to have a computer network specialist on staff full time.

Hence, there is a need for an ICS that can automatically configure itself without the need for a computer network specialist.

One aspect of an automatic configuration is the assigning of IP addresses to the internal occupants of the ICS chassis 110.

A problem is known in the automatic configuration of the ICS in that since the ICS may be a part of a Local Area Network ("LAN"), other components operatively coupled to the LAN but not part of the ICS chassis may also be assigned an IP address. If an external component is assigned an IP address by the ICS, then the ICS may interfere with the operation of other devices on the network, such as another ICS 7750

Although having an on-site computer network specialist may not present a problem to large business enterprises, small to medium sized business often cannot justify the cost of hiring a dedicated computer network specialist to maintain an ICS. In order to provide a low cost and effective ICS for small to midsize businesses, an ICS is desired that does not require a highly trained computer network specialist to be on staff with that business. In order to automatically configure the internal chassis occupants, the ICS must be able to differentiate internal chassis occupants from network components external to the ICS, and assign an IP address to the internal chassis occupants and not to the external components.

SUMMARY OF THE INVENTION

The present invention is directed towards a method for assigning an IP address to at least one internal chassis occupant in an Integrated Communications System ("ICS") having an Ethernet backplane. The backplane is coupled to an at least one internal ICS chassis occupant. The at least one internal chassis occupant has an IP address assignment module ("IPAM") operatively disposed within it. The method for assigning an IP address to the at least one internal chassis occupant comprises receiving, by the IPAM, a request for an IP address from a component; determining, by the IPAM, whether the request was received from one of the at least one internal chassis occupant; assigning an IP address, by the IPAM, to at least one internal chassis occupant if the request was received from one of the at least one internal chassis occupant.

The present invention is also directed towards an ICS comprising: an Ethernet backplane; at least one internal ICS chassis occupant operatively coupled to the backplane; wherein the at least one internal chassis occupant is configured to assign an IP address.

The present invention is further directed towards a means for coupling the Ethernet backplane of an ICS to at least one internal ICS chassis occupant and wherein the at least one internal chassis occupant has an assigning means operatively disposed within it for assigning an IP address to the at least one internal chassis occupant.

The present invention is also directed towards a program storage device readable by a machine, tangibly embodying a program of instructions executable by the machine to perform a method for assigning an IP address to at least one internal chassis occupant of an ICS. The method comprises receiving a request for an IP address from a component; determining whether the request was received from one of the at least one internal chassis occupant; assigning an IP address to at least one internal chassis occupant if the request was received from one of the at least one internal chassis occupant.

BRIEF DESCRIPTION OF THE DRAWINGS

The present invention is described in greater detail by referencing the accompanying drawings.

DETAILED DESCRIPTION

Those of ordinary skill in the art will realize that the following description of the present invention is illustrative only and not in any way limiting. Other embodiments of the invention will readily suggest themselves to such skilled persons.

Figure 1:
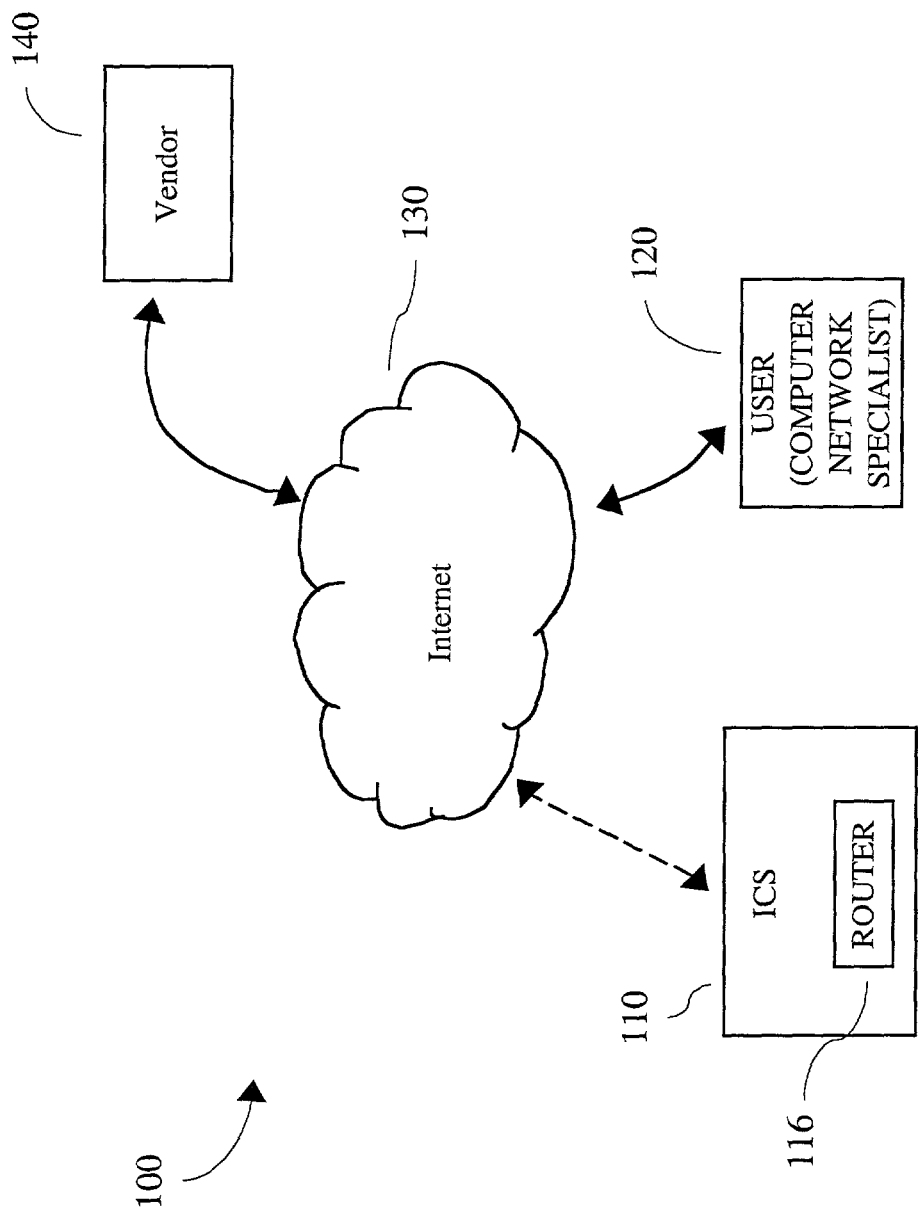
FIG. 1 is a representation of a prior art ICS system.
Figure 2A:
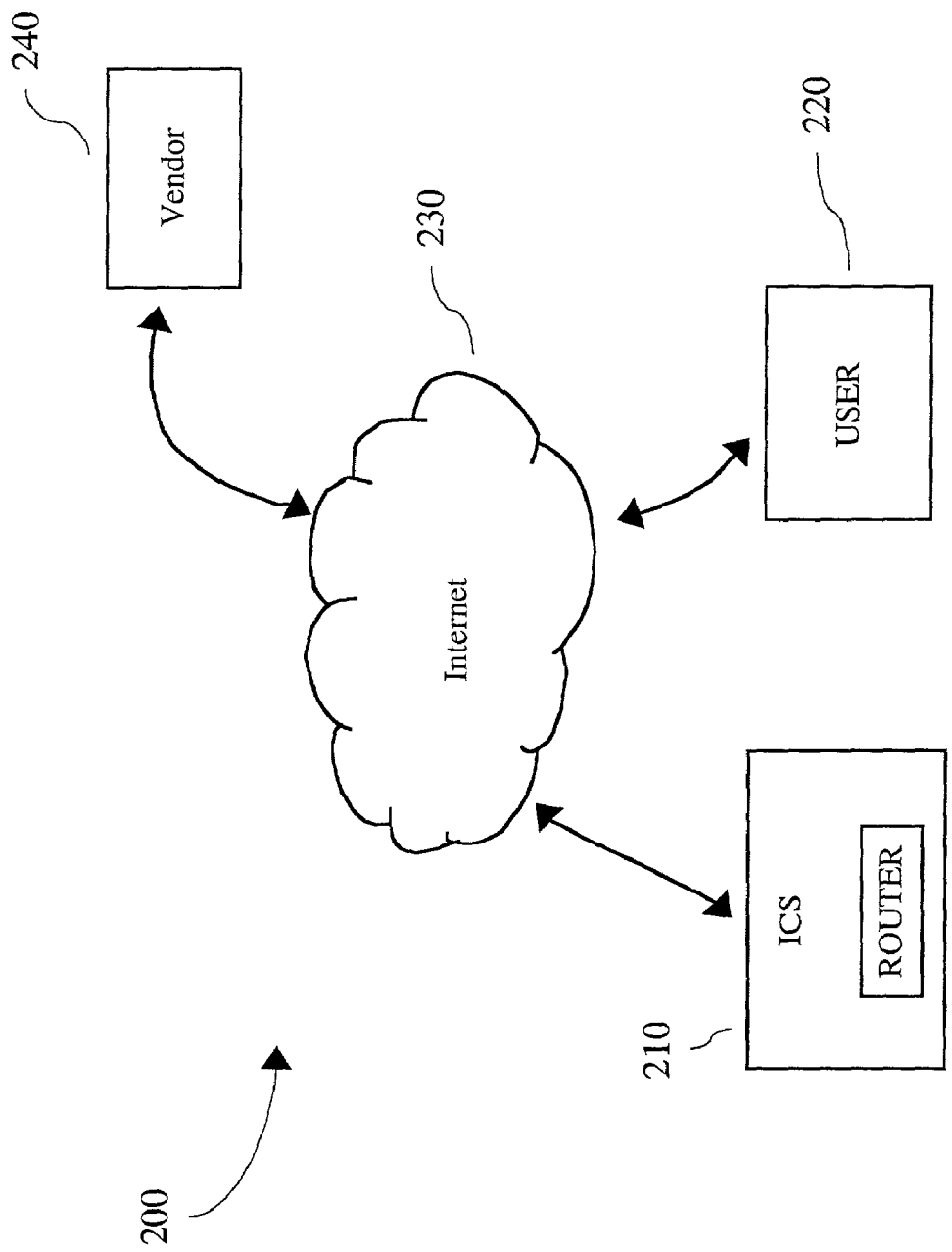
FIG. 2a is a representation of the disclosed ICS system.

Referring first to FIG. 2A, a block diagram of a communications system 200 configured in accordance with the teachings of the present disclosure is shown. The system 200 includes an ICS 210, a user 220 and a vendor 240, all operatively coupled to the internet 230. As will be discussed in more detail below, the ICS 210 is preferably configured to automatically configure itself without the need for a computer specialist and by automatically communicating with the vendor 240 through the internet 230.

Exemplary ICS Chassis

Figure 2B:
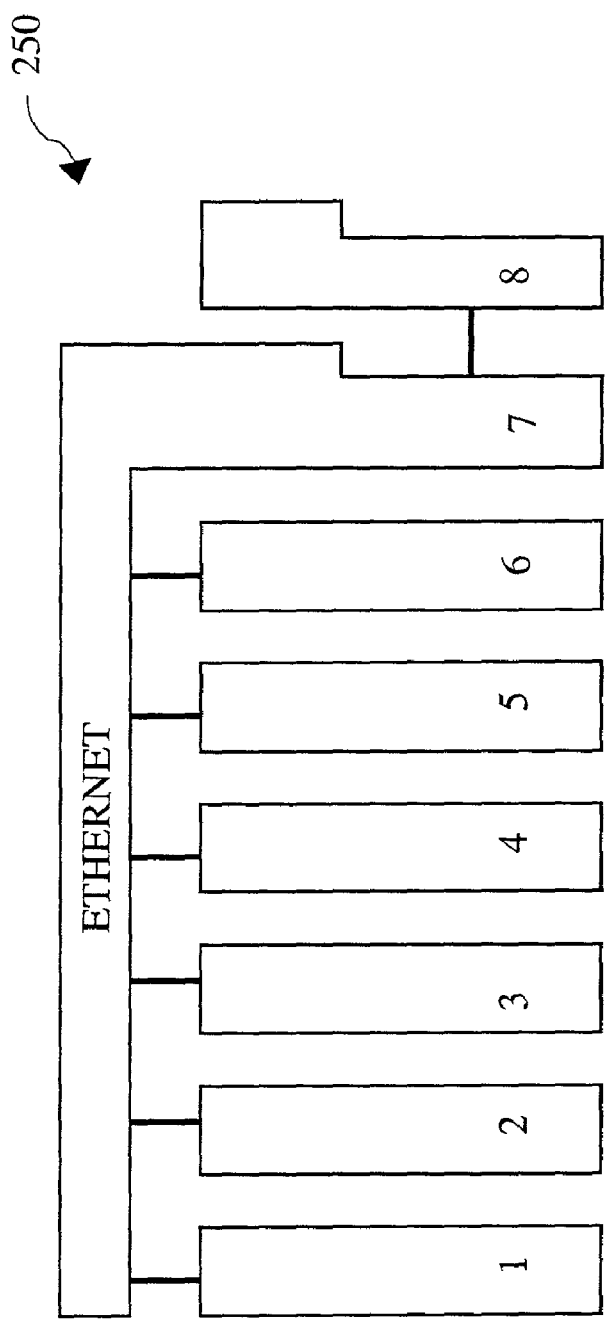
FIG. 2b is a representation of a disclosed ICS chassis.

FIG. 2b shows a representation of one aspect of an ICS chassis 250 having 8 card slots numbered 1–8. In the present disclosure, an exemplary 8 slot ICS chassis is used for illustrative purposes, but an ICS Chassis may be configured with both more and less slots as well as different slot types. The first six card slots, numbered 1 through 6, may interchangeably house various cards selected by the user, including a multiservice route processor card ("MRP") and a system processing engine card ("SPE").

An MRP is a voice and data capable router that can carry voice traffic over an IP network and can link small to medium sized remote Ethernet LANs to central offices over WAN links. An MRP has two slots that support WAN interface cards ("WICs"), voice WAN interface cards ("VWICs"), and voice interface cards ("VICs"); two packet voice data module ("PVDM") slots for adding digital signal processors ("DSPs"); a dual inline memory module ("DIMM") slot for upgrading MRP memory; and a socket for a Virtual Private Network ("VPN") module.

An SPE is a single board computer that runs system software applications such as Cisco Systems, Inc.'s ICS 7700 System Manager and Cisco Systems, Inc. CallManager. At least two types of SPEs are manufactured by Cisco Systems, Inc. which can be installed in slots 1 through 6: Cisco Systems, Inc.'s model SPE 310 which has a 700-MHz Pentium III processor, a 20.4-GB hard disk drive, up to 1.5 GB of memory, a keyboard port, two universal serial bus ("USB") ports, and a video port, and Cisco Systems, Inc.'s model SPE 200 which has a 266-MHz Pentium II processor, a 6-GB hard disk drive, and 512 MB of memory. Of course other cards may be developed by CISCO and other manufacturers to fill in slots 1 through 8.

Slot 7 may be dedicated to a system switch processor ("SSP") which is an Ethernet switch that passes data among all cards in the ICS chassis 250 and to any other Ethernet switches connected to the system. Slot 7 is designed to house an SSP which is an Ethernet switch, thus slot 7 is represented in FIG. 2b as being operationally coupled via the Ethernet switch to slots 1 through 6. Slot 7 may be directly coupled to slot 8.

Slot 8, may be dedicated to a system alarm processor card ("SAP") which is a module that monitors the status of the chassis, power supply modules, and fans, and feeds real-time data to the SPEs. The cards occupying slots 1 through 8 are referred to as internal chassis occupants.

Discovery Protocol

The cards which occupy the slots in the ICS chassis may have a built-in discovery protocol for discovering devices on a network as is known in the art. One example of a discovery protocol is the Cisco Discovery Protocol ("CDP"). Each card, other than the SAP, in the ICS chassis is a CDP-compatible device that sends periodic messages to the SSP containing information such as the IP address assigned to each card; the interface of each card, which is location information for each card specifying which slot in the ICS chassis the card is located in; and the platform string for each card, which specifies what the card is, e.g., an SPE, MRP, or SSP. As is known by those skilled in the art, CDP is one of many discovery protocols known in the art, and the disclosed system may employ any discovery protocol known in the art.

Figure 3:
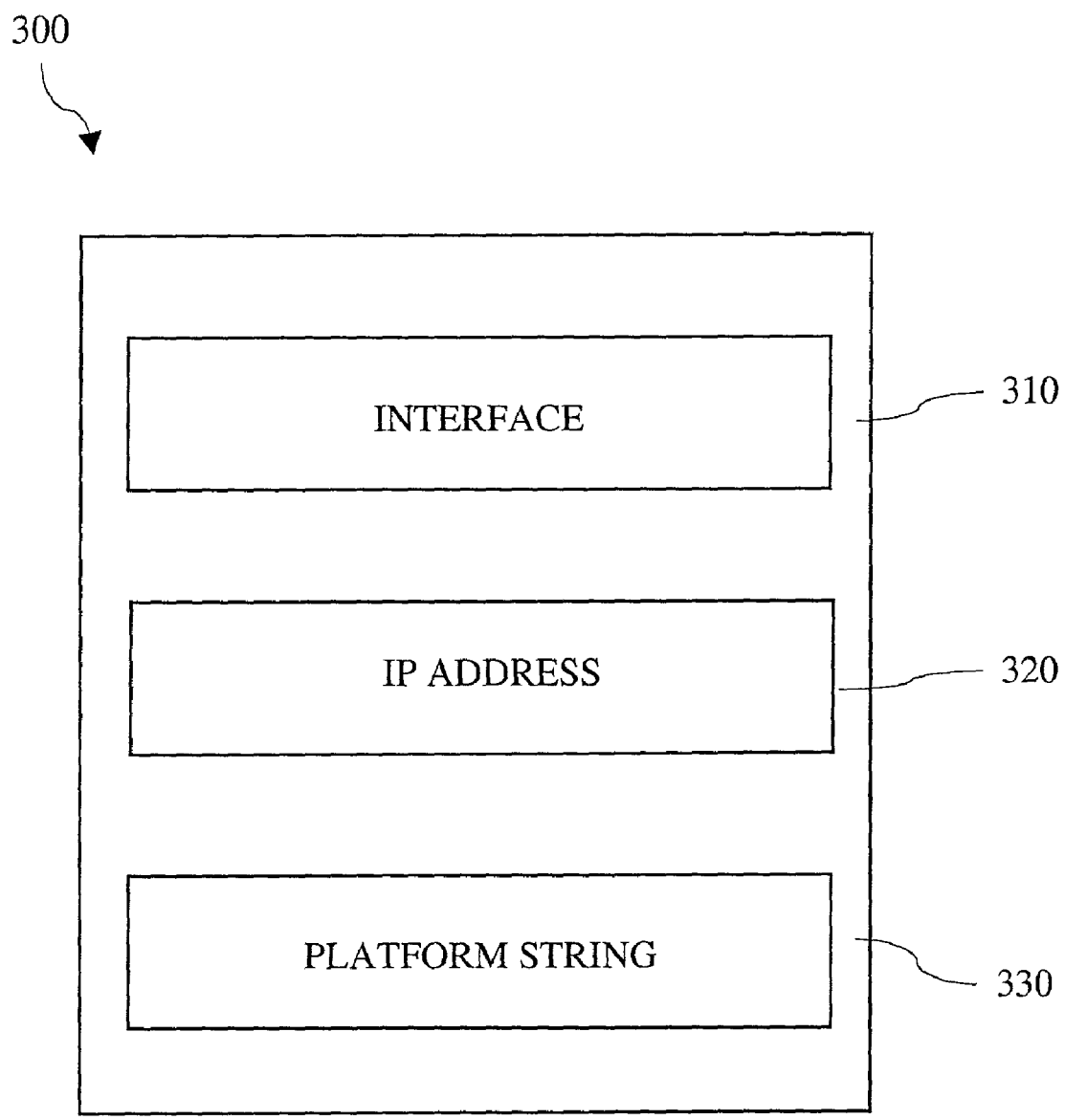
FIG. 3 is a representation of a discovery protocol data package.

FIG. 3 shows a CDP data package 300 containing information regarding a particular occupant of an ICS chassis. For example, the CDP data package 300 may include such information as interface information 310, an IP address 320, and a platform string 330, all corresponding to a particular internal chassis occupant. As is appreciated by those skilled in the art, a wide variety of information may be stored within the CDP data package 300. Each card in the ICS chassis sends periodic messages to the SSP containing its CDP data package, the SSP in turn stores the CDP data package it receives from each internal chassis occupant. The SSP may also receive CDP data packages from external network devices not located within the ICS chassis, because the ICS is part of a Local Area Network ("LAN") and is therefore operatively coupled to external network devices.

As is known by those of ordinary skill in the art, in order for the ICS system to automatically configure itself, the internal components must be able to communicate with each other. Typically, internal occupants may communicate with each other using standard networking protocols.

Examples of communications protocols known in the art include the Hypertext Transfer Protocol ("HTTP") and the Simple Network Management Protocol ("SNMP").

HTTP is the communication protocol used for transmitting data between servers and clients (browsers) on the World Wide Web. HTTP also has variants, such as Secure HyperText Transfer Protocol ("SHTTP") and one based on the Secure Sockets Layer ("SLL") where URLs are addressed HTTPS. The SNMP is an application-layer protocol that facilitates the exchange of management information between network devices and it is part of the Transmission Control Protocol/Internet Protocol ("TCP/IP") protocol suite. SNMP enables network administrators to manage network performance, find and solve network problems, and plan for network growth.

However, in order to communicate with one another, the internal chassis occupants of an ICS must first be assigned an IP address. Typically, an IP address may be assigned to the internal components of an ICS using a configuration protocol (generically referred to as "CP") known in the art, such as the Dynamic Host Configuration Protocol ("DHCP") and the Bootstrap Protocol ("BootP").

The Dynamic Host Configuration Protocol ("DHCP") is used to enable hosts ("DHCP Clients") on an IP network to obtain their configurations from a server, thereby reducing the work necessary to administer an IP network. The most significant configuration option the client receives from the server is its IP address. Typically, the client sends a request to a server (optionally, with its suggested IP address). The server then responds with an available IP address. Next, the client sends a request to the selected server for its configuration options. Finally, the server responds with the client's committed IP address along with other options such as its netmask.

The BootP protocol uses the User Datagram Protocol ("UDP") to formulate a network request to allow a device to obtain and configure its own IP information, such as IP address and subnet mask.

The SPE may have a CP server stored and operating on it. The CP clients may be stored and operating on the various internal chassis occupants as well as network components external to the communications chassis.

Figure 4:
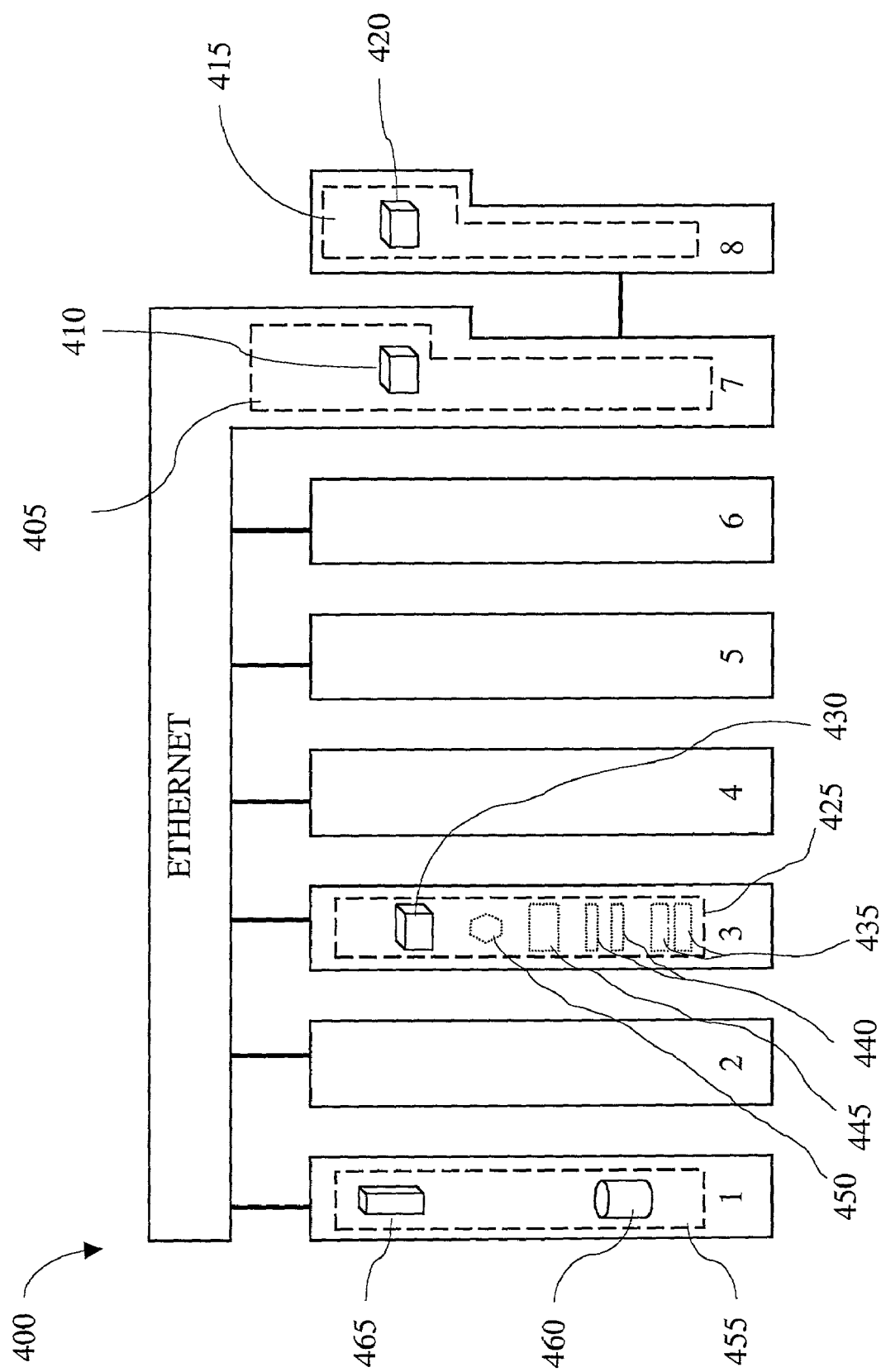
FIG. 4 is a more detailed view of a disclosed ICS chassis with internal chassis occupants.

FIG. 4 is a conceptual diagram of one aspect of a disclosed system 400. The system 400 may include an Ethernet backplane shown by slot 7 for providing connectivity to at least one internal chassis occupant. In one disclosed aspect of a system 400, the backplane of slot 7 may comprise an SSP 405 as described above. The SSP is shown occupying slot 7 in system 400, but the SSP may occupy any other slot as may be designed. The SSP may further comprise a configuration protocol client 410.

The system 400 may further include a SAP 415 for monitoring the status of the system and for providing external connectivity. The SAP 415 may be installed in slot 8 of the system, though the system may be designed such that the SAP may occupy any desired slot. The SAP may further comprise a configuration protocol client 420.

The system 400 may also further include an MRP 425 operatively coupled to slot 3. The MRP may also further comprise a configuration protocol client 430, operatively disposed within the MRP. As discussed above, the MRP may be comprised of two slots 435 that support WICs, VWICs, and voice interface cards VICs; two PVDM slots 440 for adding DSPs; a DIMM slot 445 for upgrading MRP memory; and a socket 450 for a VPN module. The MRP may occupy any of slots 1 through 6. Further, the MRP may be configured to accept different components and different numbers of components than those used herein for illustrative purposes.

The system 400 may further include at least one internal occupant 455 operatively disposed within the system 400 at slot 1. In one embodiment, an SPE 455 may occupy slot 1. In the shown embodiment the SPE may occupy any of the slots 1 through 6. The SPE may further comprise a configuration protocol server 465 operatively disposed within it. In another aspect of the disclosed system, an IP address assignment module ("IPAM") 460 may be operatively disposed in the SPE 455. The IPAM will be discussed in further detail in the next section.

In the above illustrative description, the chassis occupants 405, 415, 425 and 455 comprise the occupants of slots 1–8 which may be operatively coupled to the backplane of slot 7. However, it is contemplated that there may be any number of occupants depending on the type of system and equipment used. The SSP may be operationally coupled to other network devices that are not within the ICS chassis system.

Exemplary Operations of the Disclosed System

An aspect of a disclosed system may identify whether a request for an IP address is from an internal chassis occupant or from an external component.

Figure 5:
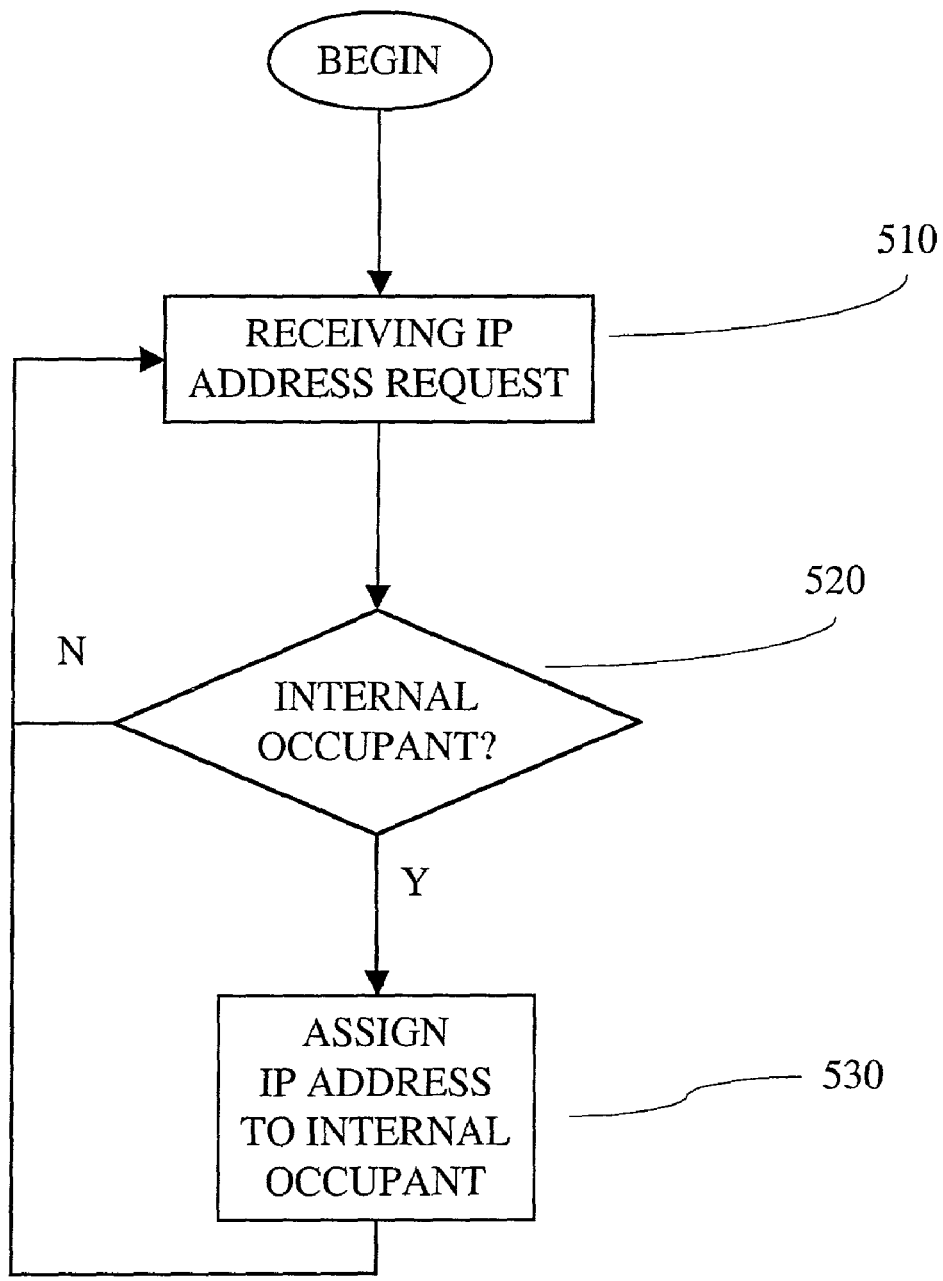
FIG. 5 is flow chart of a disclosed system.

Referring to FIG. 5, there is shown generally the steps of an algorithm for a disclosed system, the algorithm shall be referred to as an IP address assignment module ("IPAM"). The IPAM may be operatively disposed in an SPE, however, the other components of the ICS may be configured to accept the IPAM. At act 510, the IPAM receives an IP address request. Such a request may come from a CP client installed on a internal chassis occupant or in an external network component. Non-limiting examples of CP clients known in the art are the DHCP client and the BootP client.

Once the system receives an IP address request, at query 520 the system determines whether the component that made the request is an internal chassis occupant. Examples of internal components include the following: the SSP 405, the MRP 425 and the SPE 455 as shown and described in FIG. 4. Although the SAP 415 is an internal component, it is not an IP device and does not request an IP address. However, a SAP may be designed to be an IP device. Examples of external components may include other network operatively coupled to other Ethernet ports of the backplane in the SSP.

If the system at query 520 determines that the requesting component is an internal chassis occupant, the system proceeds to act 530 where an IP address is assigned to the requesting internal chassis occupant. The IP address may be assigned using conventional CPs such as DHCP and BootP.

After the IP address has been assigned, the process may return to act 510 and repeat for the next request.

If at query 520, the system determines that the component is not an internal occupant, the system may return to act 510 and wait for the next IP address request.

Figure 6:
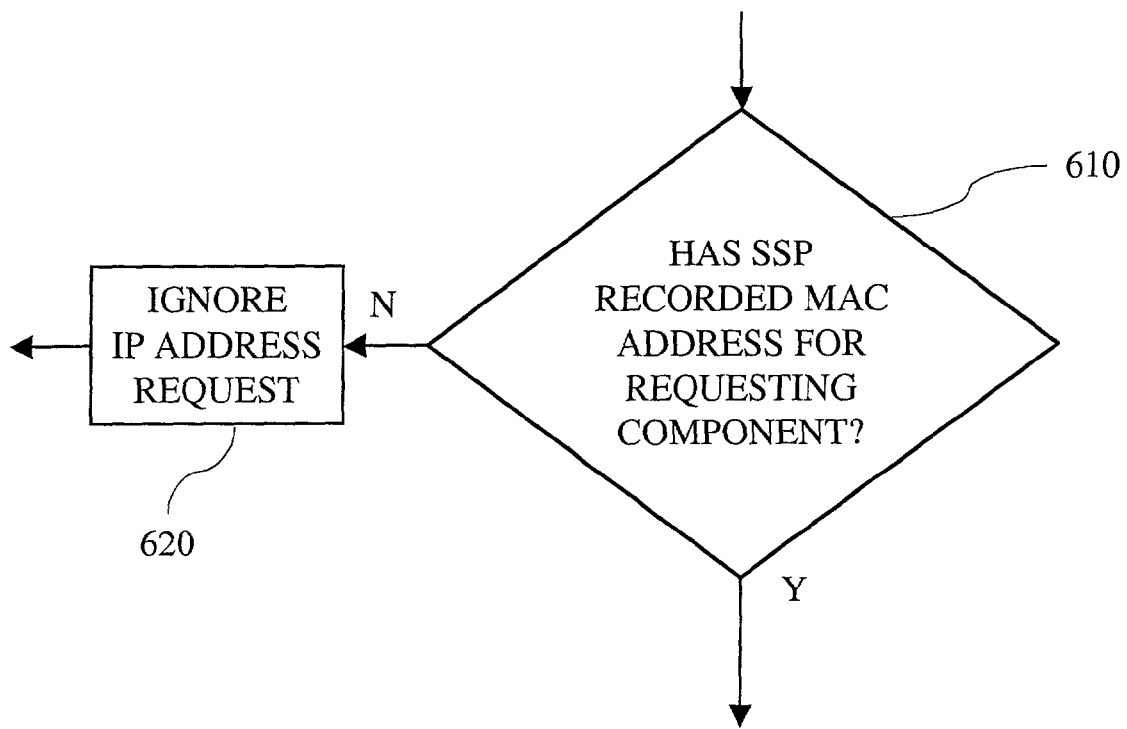
FIG. 6 is a flow chart of a disclosed system.

In another aspect of the system, query 520 of FIG. 5, may further comprise the following acts and queries referred to in FIG. 6. At act 610, the system queries the SSP about whether it has recorded a MAC address for the requesting component. One way the configuration protocols operate, is that the client requests an IP address for the component upon which it is installed and running. That component has a unique MAC address. The SSP may keep track of the various MAC addresses associated with a particular slot of the ICS chassis. This MAC address is obtained by the SSP from any data packet sent through the Ethernet back-plane, whether it be a CDP packet, a BOOTP/DHCP packet, or any other Ethernet packet. Thus, when the IPAM receives a request for an IP address from a component, the IPAM queries the SSP to determine whether the SSP has recorded the MAC address for that particular component. If it has, the IPAM knows that it is an internal occupant.

If the component is an internal chassis occupant, ie. the SSP has recorded a MAC address for the requesting component, the IPAM proceeds to act 530 of FIG. 5.

Another aspect of the disclosed system is also shown in FIG. 6. After the IPAM determines that the component is not an internal occupant, the IPAM goes to act 620, wherein the IPAM ignores the request for an IP address. After act 620, the IPAM goes back to act 510 of FIG. 5.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An ICS comprised of at least eight card slots comprising:
    an Ethernet backplane;
    at least one internal ICS chassis occupant operatively coupled to said backplane;
    wherein said at least one internal chassis occupant is configured to assign IP addresses, receive a request for an IP address from a component, determine whether said request was received from one of said at least one internal chassis occupant, and assign an IP address to at least one internal chassis occupant if said request was received from one of said at least one internal chassis occupant; and
    wherein one card slot of the said eight card slots is dedicated to a System Switch Processor card, wherein one card slot of the said eight card slots is dedicated to a System Alarm Processor card, and wherein the remaining six card slots of the said eight card slots may interchangeably house various cards selected by a user.

2. The ICS of claim 1, wherein said cards selected by the user are multiservice route processor cards.

3. The ICS of claim 1, wherein said cards selected by the user are system processing engine cards.

* * * * *